United States Patent
Shin et al.

(10) Patent No.: US 10,889,662 B2
(45) Date of Patent: *Jan. 12, 2021

(54) METALLOCENE-SUPPORTED CATALYST AND METHOD OF PREPARING POLYOLEFIN USING THE SAME

(71) Applicant: LG CHEM, LTD., Seoul (KR)

(72) Inventors: Eun Young Shin, Daejeon (KR); Heon Yong Kwon, Daejeon (KR); Se Young Kim, Daejeon (KR); Hyun Jee Kwon, Daejeon (KR); Dae Sik Hong, Daejeon (KR); Sung Min Lee, Daejeon (KR); Ki Soo Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 30 days.

This patent is subject to a terminal disclaimer.

(21) Appl. No.: 15/516,568

(22) PCT Filed: Dec. 14, 2015

(86) PCT No.: PCT/KR2015/013680
§ 371 (c)(1),
(2) Date: Apr. 3, 2017

(87) PCT Pub. No.: WO2016/093678
PCT Pub. Date: Jun. 16, 2016

(65) Prior Publication Data
US 2018/0265605 A1  Sep. 20, 2018

(30) Foreign Application Priority Data
Dec. 12, 2014  (KR) .................. 10-2014-0179763

(51) Int. Cl.
| | | |
|---|---|---|
| *B01J 31/02* | (2006.01) | |
| *C08F 4/6592* | (2006.01) | |
| *C08F 210/16* | (2006.01) | |
| *B01J 31/22* | (2006.01) | |
| *B01J 31/38* | (2006.01) | |
| *C08F 4/659* | (2006.01) | |
| *C08F 2/04* | (2006.01) | |
| *C08F 2/34* | (2006.01) | |

(52) U.S. Cl.
CPC ....... *C08F 4/65927* (2013.01); *B01J 31/0274* (2013.01); *B01J 31/2295* (2013.01); *B01J 31/38* (2013.01); *C08F 210/16* (2013.01); *C08F 2/04* (2013.01); *C08F 2/34* (2013.01); *C08F 4/65912* (2013.01); *C08F 4/65916* (2013.01); *C08F 2500/01* (2013.01); *C08F 2500/02* (2013.01); *C08F 2500/12* (2013.01); *C08F 2500/18* (2013.01)

(58) Field of Classification Search
None
See application file for complete search history.

(56) References Cited

U.S. PATENT DOCUMENTS

| | | | |
|---|---|---|---|
| 5,032,562 A | 7/1991 | Lo et al. | |
| 5,525,678 A | 6/1996 | Mink et al. | |
| 5,914,289 A | 6/1999 | Razavi | |
| 6,232,484 B1 | 5/2001 | Schaverien et al. | |
| 6,306,791 B2 | 10/2001 | Schaverien et al. | |
| 6,391,816 B1 | 5/2002 | McDaniel et al. | |
| 6,462,212 B1 | 10/2002 | Wu | |
| 6,673,880 B2 | 1/2004 | Schaverien et al. | |
| 6,984,703 B1* | 1/2006 | Biagini | C07C 13/465 502/103 |
| 7,220,804 B1 | 5/2007 | Kao | |
| 7,223,822 B2 | 5/2007 | Abhari et al. | |
| 7,776,977 B2 | 8/2010 | Kao | |
| 8,557,902 B2 | 10/2013 | Holtcamp et al. | |
| 8,569,532 B2* | 10/2013 | Voskoboynik | C07F 17/00 502/103 |
| 9,580,533 B2 | 2/2017 | Jiang et al. | |
| 2003/0195306 A1* | 10/2003 | Tsuie | C08F 210/02 526/127 |
| 2013/0085232 A1 | 4/2013 | Stewart | |

FOREIGN PATENT DOCUMENTS

| | | |
|---|---|---|
| CN | 101172988 A | 5/2008 |
| CN | 102336855 B | 4/2014 |
| JP | 05-320237 A | 12/1993 |
| JP | 10-204112 A | 8/1998 |
| JP | 2000-053691 A | 2/2000 |
| JP | 3371919 B2 | 1/2003 |
| JP | 2004-511634 A | 4/2004 |
| JP | 2004-517161 A | 6/2004 |
| JP | 5348732 B2 | 11/2013 |
| JP | 2014-530272 A | 11/2014 |
| KR | 10-2004-0076965 A | 9/2004 |
| KR | 10-2015-0066344 A | 6/2015 |
| KR | 10-2015-0066484 A | 6/2015 |
| WO | 2004-076502 A1 | 9/2004 |
| WO | 2006-101595 A1 | 9/2006 |
| WO | 2015-030996 A1 | 3/2015 |

OTHER PUBLICATIONS

Song, W. et al., Error Formation in Ansa-Zirconocene Catalyzed Isotactic Propylene Polymerization. Journal of Organometallic Chemistry. 1996 vol. 512, pp. 131-140.

Kaminsky, W. et al., Stereospecific Oligo- and Polymerization with Metallocene Catalysts. Macromol. Symp. 1995, vol. 89, pp. 203-219.

Chien, J. C. W. et al., Difference in Stereoselective Polymerization of 4-Methyl-I-Hexene by Homogeneous and Heterogeneous Ziegler-Natta catalysts. Makromol. Chem., Rapid Commun. 1992, vol. 13, pp. 479-484.

(Continued)

Primary Examiner — Yun Qian
(74) Attorney, Agent, or Firm — Dentons US LLP

(57) ABSTRACT

Provided are a novel metallocene-supported catalyst and a method of preparing a polyolefin using the same. The metallocene-supported catalyst according to the present disclosure may be used in the preparation of polyolefins, it may have excellent activity and excellent reactivity with comonomers, and it may prepare olefinic polymers having a high molecular weight and a low molecular weight.

9 Claims, No Drawings

(56) References Cited

OTHER PUBLICATIONS

Gomez, F. J. et al., Syndiospecific Propylene Polymerization Using C1-Symmetric Ansa-Metallocene Catalysts: Substituent and Bridge Effects Macromolecules. 2002, vol. 35, pp. 3358-3368.
LoCoco et al. Chelate-Controlled Synthesis of Racemic ansa-Zirconocenes, J. Am. Chem. Soc. vol. 125, 46, 2004 pp. 15231-15244.

* cited by examiner

METALLOCENE-SUPPORTED CATALYST AND METHOD OF PREPARING POLYOLEFIN USING THE SAME

CROSS-REFERENCE TO RELATED APPLICATION

This application is a National Stage Entry of International Application No. PCT/KR2015/013680 filed on Dec. 14, 2015, and claims the benefit of and priority to Korean Application No. 10-2014-0179763, filed on Dec. 12, 2014, all of which are hereby incorporated by reference in their entirety for all purposes as if fully set forth herein.

TECHNICAL FIELD

The present disclosure relates to a novel metallocene-supported catalyst and a method of preparing a polyolefin using the same.

BACKGROUND OF THE INVENTION

Olefin polymerization catalyst systems may be divided into Ziegler-Natta and metallocene catalysts, and these highly active catalyst systems have been developed in accordance with their characteristics. The Ziegler-Natta catalyst has been widely applied to commercial processes since it was developed in the 1950's. However, since the Ziegler-Natta catalyst is a multi-active site catalyst in which a plurality of active sites are mixed, it has a feature that a resulting polymer has a broad molecular weight distribution. Also, since a compositional distribution of comonomers is not uniform, there is a problem that it is difficult to obtain desired physical properties.

Meanwhile, the metallocene catalyst includes a main catalyst having a transition metal compound as a main component and an organometallic compound cocatalyst having aluminum as a main component. Such a catalyst is a single-site catalyst which is a homogeneous complex catalyst, and offers a polymer having a narrow molecular weight distribution and a uniform compositional distribution of comonomers, depending on the single site characteristics. The stereoregularity, copolymerization characteristics, molecular weight, crystallinity, etc. of the resulting polymer may be controlled by changing a ligand structure of the catalyst and polymerization conditions.

U.S. Pat. No. 5,032,562 discloses a method of preparing a polymerization catalyst by supporting two different transition metal catalysts on one support. This catalyst is prepared by supporting a titanium (Ti)-based Ziegler-Natta catalyst which produces a high molecular weight polymer and a zirconium (Zr)-based metallocene catalyst which produces a low molecular weight polymer on one support, and results in a bimodal molecular weight distribution. This catalyst is disadvantageous in that the supporting procedure is complicated and morphology of polymers is poor due to a cocatalyst.

U.S. Pat. No. 5,525,678 discloses a method of using a catalyst system for olefin polymerization, in which a metallocene compound and a non-metallocene compound are simultaneously supported on a support to realize simultaneous polymerization of a high molecular weight polymer and a low molecular weight polymer. However, there are disadvantages that the metallocene compound and non-metallocene compound must be separately supported and the support must be pretreated with various compounds for supporting.

U.S. Pat. No. 5,914,289 discloses a method of controlling a molecular weight and a molecular weight distribution of polymers using metallocene catalysts which are respectively supported on supports. However, a large amount of solvent and a long period of time are required to prepare the supported catalysts, and a process of supporting metallocene catalysts on the respective supports is troublesome.

Korean Patent Application No. 2003-12308 discloses a method of controlling molecular weight distributions of polymers, in which the polymerization is performed while changing a combination of catalysts in a reactor by supporting a dinuclear metallocene catalyst and a mononuclear metallocene catalyst on a support together with an activating agent. However, this method has limitations in simultaneously realizing the characteristics of respective catalysts. In addition, there is a disadvantage that the metallocene catalysts depart from a supported component of the resulting catalyst to cause fouling in the reactor.

Meanwhile, a slurry process of employing the existing metallocene-supported catalyst has a problem of low productivity due to low density and low bulk density (BD) of a produced polymer powder.

Accordingly, to solve the above drawbacks, there is a continuous demand for a method of preparing polyolefins with desired physical properties by easily preparing a metallocene-supported catalyst having excellent activity.

DETAILS OF THE INVENTION

Objects of the Invention

To solve the above problems in the prior arts, the present disclosure provides a metallocene-supported catalyst which has excellent activity and productivity and is able to prepare polyolefins having a high molecular weight and a low molecular weight, a method of preparing a polyolefin using the same, and a polyolefin prepared by using the same.

Means for Achieving the Object

The present disclosure provides a metallocene-supported catalyst including one or more metallocene compounds represented by the following Chemical Formula 1 or Chemical Formula 2, a cocatalyst compound, and a support:

[Chemical Formula 1]

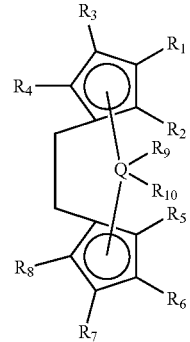

wherein, in Chemical Formula 1, $R_1$ and $R_2$, and $R_5$ and $R_6$, are the same as or different from each other, and are each independently hydrogen or a C1 to C20 alkyl group;

$R_3$ and $R_4$, and $R_7$ and $R_8$, are the same as or different from each other, and are each independently hydrogen or a C1 to C20 alkyl group, or two or more neighboring groups of $R_3$ and $R_4$, and $R_7$ and $R_8$, are connected to each other to form a substituted or unsubstituted aliphatic or aromatic ring;

Q is a Group 4 transition metal; and $R_9$ and $R_{10}$ are the same as or different from each other, and are each independently a C1 to C20 alkylate group,

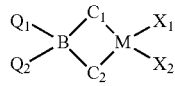

[Chemical Formula 2]

wherein, in Chemical Formula 2, M is a Group 4 transition metal;

B is carbon, silicon, or germanium;

$Q_1$ and $Q_2$ are the same as or different from each other, and are each independently hydrogen, a halogen, a C1 to C20 alkyl group, a C2 to C20 alkenyl group, a C6 to C20 aryl group, a C7 to C20 alkylaryl group, a C7 to C20 arylalkyl group, a C1 to C20 alkoxy group, a C2 to C20 alkoxyalkyl group, a C3 to C20 heterocycloalkyl group, or a C5 to C20 heteroaryl group;

$X_1$ and $X_2$ are the same as or different from each other, and are each independently a C1 to C20 alkylate group; and $C_1$ and $C_2$ are the same as or different from each other, and are each independently represented by any one of the following Chemical Formula 3a, Chemical Formula 3b, Chemical Formula 3c, and Chemical Formula 3d, provided that one or more of $C_1$ and $C_2$ is represented by Chemical Formula 3a,

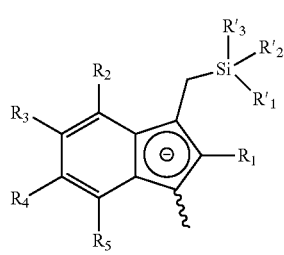

[Chemical Formula 3a]

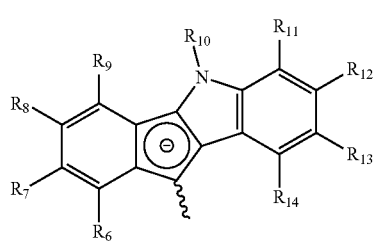

[Chemical Formula 3b]

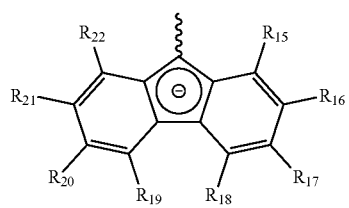

[Chemical Formula 3c]

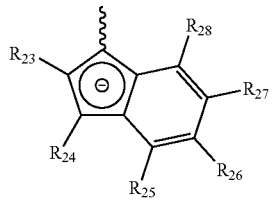

[Chemical Formula 3d]

wherein, in Chemical Formulae 3a, 3b, 3c, and 3d, $R_1$ to $R_{28}$ are the same as or different from each other, and are each independently hydrogen, a halogen, a C1 to C20 alkyl group, a C2 to C20 alkenyl group, a C1 to C20 alkylsilyl group, a C1 to C20 silylalkyl group, a C1 to C20 alkoxysilyl group, a C1 to C20 ether group, a C1 to C20 silylether group, a C1 to C20 alkoxy group, a C6 to C20 aryl group, a C7 to C20 alkylaryl group, or a C7 to C20 arylalkyl group, $R'_1$ to $R'_3$ are the same as or different from each other, and are each independently, hydrogen, a halogen, a C1 to C20 alkyl group, a C2 to C20 alkenyl group, or a C6 to C20 aryl group, and two or more neighboring groups of $R_1$ to $R_{28}$ are connected to each other to form a substituted or unsubstituted aliphatic or aromatic ring.

Further, the present disclosure provides a method of preparing a polyolefin, the method including polymerizing olefinic monomers in the presence of the above catalyst.

In addition, the present disclosure provides a polyolefin which is prepared according to the above preparation method.

Effects of the Invention

A metallocene-supported catalyst according to the present invention may be used in the preparation of polyolefins, and it may remarkably improve solubility of a precursor compound, have excellent activity and excellent reactivity with comonomers, and prepare polyolefins having a high molecular weight and a low molecular weight.

Particularly, the metallocene catalyst compound of the present disclosure may exhibit high polymerization activity even when it is supported on a support, thereby preparing polyolefins having a high molecular weight and a low molecular weight.

Furthermore, since the catalyst has a long lifetime, its activity may be maintained even for a long residence time in a reactor.

DETAILED DESCRIPTION OF THE EMBODIMENT

Although the term "first", "second", etc. may be used herein to describe various elements, these terms are only used to distinguish one element from another.

Further, the terminology used herein is for the purpose of describing exemplary embodiments only and it is not intended to restrict the present invention. The singular forms are intended to include the plural forms as well, unless the context clearly indicates otherwise. The term "include", "equip", or "have" is intended to specify the presence of stated features, integers, steps, elements, or combinations thereof, but does not preclude the presence or addition of one or more other features, integers, steps, elements, or combinations thereof.

While the present invention is susceptible to various modifications and alternative forms, specific embodiments will be illustrated and described in detail as follows. It should be understood, however, that the description is not intended to limit the present invention to the particular forms disclosed, but on the contrary, the intention is to cover all modifications, equivalents, and alternatives falling within the spirit and scope of the invention.

Hereinafter, the present disclosure will be described in more detail.

A metallocene-supported catalyst according to the present disclosure is characterized by including one or more metallocene compounds represented by the following Chemical Formula 1 or Chemical Formula 2, a cocatalyst compound, and a support:

[Chemical Formula 1]

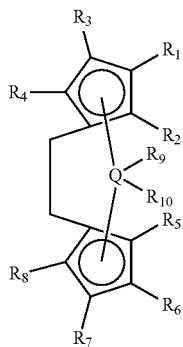

wherein, in Chemical Formula 1, $R_1$ and $R_2$, and $R_5$ and $R_6$, are the same as or different from each other, and are each independently hydrogen or a C1 to C20 alkyl group;

$R_3$ and $R_4$, and $R_7$ and $R_8$, are the same as or different from each other, and are each independently hydrogen or a C1 to C20 alkyl group, or two or more neighboring groups of $R_3$ and $R_4$, and $R_7$ and $R_8$, are connected to each other to form a substituted or unsubstituted aliphatic or aromatic ring;

Q is a Group 4 transition metal; and $R_9$ and $R_{10}$ are the same as or different from each other, and are each independently a C1 to C20 alkylate group,

[Chemical Formula 2]

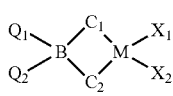

wherein, in Chemical Formula 2, M is a Group 4 transition metal;

B is carbon, silicon, or germanium;

$Q_1$ and $Q_2$ are the same as or different from each other, and are each independently hydrogen, a halogen, a C1 to C20 alkyl group, a C2 to C20 alkenyl group, a C6 to C20 aryl group, a C7 to C20 alkylaryl group, a C7 to C20 arylalkyl group, a C1 to C20 alkoxy group, a C2 to C20 alkoxyalkyl group, a C3 to C20 heterocycloalkyl group, or a C5 to C20 heteroaryl group;

$X_1$ and $X_2$ are the same as or different from each other, and are each independently a C1 to C20 alkylate group; and $C_1$ and $C_2$ are the same as or different from each other, and are each independently represented by any one of the following Chemical Formula 3a, Chemical Formula 3b, Chemical Formula 3c, and Chemical Formula 3d, provided that one or more of $C_1$ and $C_2$ are represented by Chemical Formula 3a,

[Chemical Formula 3a]

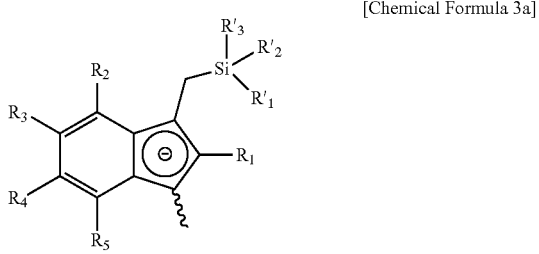

[Chemical Formula 3b]

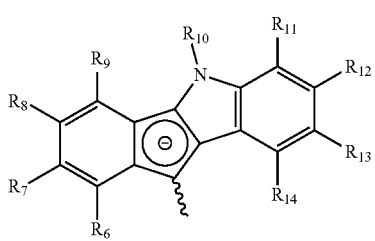

[Chemical Formula 3c]

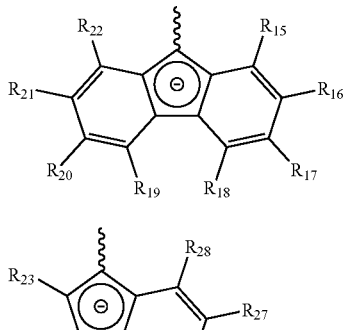

[Chemical Formula 3d]

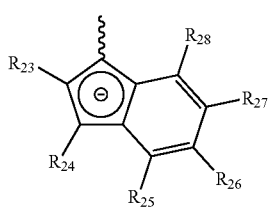

wherein, in Chemical Formulae 3a, 3b, 3c, and 3d, $R_1$ to $R_{28}$ are the same as or different from each other, and are each independently hydrogen, a halogen, a C1 to C20 alkyl group, a C2 to C20 alkenyl group, a C1 to C20 alkylsilyl group, a C1 to C20 silylalkyl group, a C1 to C20 alkoxysilyl group, a C1 to C20 ether group, a C1 to C20 silylether group, a C1 to C20 alkoxy group, a C6 to C20 aryl group, a C7 to C20 alkylaryl group, or a C7 to C20 arylalkyl group;

$R'_1$ to $R'_3$ are the same as or different from each other, and are each independently, hydrogen, a halogen, a C1 to C20 alkyl group, a C2 to C20 alkenyl group, or a C6 to C20 aryl group; and two or more neighboring groups of $R_1$ to $R_{28}$ are connected to each other to form a substituted or unsubstituted aliphatic or aromatic ring.

Particularly, in the present disclosure, a particular substituent is introduced into the transition metal in the metallocene compound of Chemical Formula 1 or Chemical Formula 2, thereby remarkably improving solubility of the metallocene compound and activity of a catalyst on which the metallocene compound is supported. $R_9$ and $R_{10}$ in Chemical Formula 1 or $X_1$ and $X_2$ in Chemical Formula 2 may be a C1 to C20 and preferably a C1 to C10 alkylate group.

With regard to the metallocene-supported catalyst according to the present disclosure, the substituents of Chemical Formula 1 or Chemical Formula 2 are described in more detail as follows.

The C1 to C20 alkyl group may include a linear or branched alkyl group, and specifically, it may include a methyl group, an ethyl group, a propyl group, an isopropyl group, an n-butyl group, a tert-butyl group, a pentyl group, a hexyl group, a heptyl group, an octyl group, etc., but is not limited thereto.

The Group 4 transition metal may include titanium (Ti), zirconium (Zr), hafnium (Hf), etc., but is not limited thereto.

The C1 to C20 alkylate group may include a linear or branched alkylate group, and specifically, it may include a methylate group, an ethylate group, a propylate group, a pyvalate group, etc. Among them, the pyvalate group is applied to additionally produce active species and improve solubility, thereby improving activity and productivity.

The C2 to C20 alkenyl group may include a linear or branched alkenyl group, and specifically, it may include an allyl group, an ethenyl group, a propenyl group, a butenyl group, a pentenyl group, etc., but is not limited thereto.

The C6 to C20 aryl group may include a single ring aryl group or a condensed ring aryl group, and specifically, it may include a phenyl group, a biphenyl group, a naphthyl group, a phenanthrenyl group, a fluorenyl group, etc., but is not limited thereto.

The C5 to C20 heteroaryl group may include a single ring heteroaryl group or a condensed ring heteroaryl group, and specifically, it may include a carbazolyl group, a pyridyl group, a quinoline group, an isoquinoline group, a thiophenyl group, a furanyl group, an imidazole group, an oxazolyl group, a thiazolyl group, a triazine group, a tetrahydropyranyl group, a tetrahydrofuranyl group, etc., but is not limited thereto.

The C1 to C20 alkoxy group may include a methoxy group, an ethoxy group, a phenyloxy group, a cyclohexyloxy group, a tert-butoxyhexyl group, etc., but is not limited thereto.

The C1 to C20 alkylsilyl group may include a methylsilyl group, a dimethylsilyl group, a trimethylsilyl group, etc., but is not limited thereto.

The C1 to C20 silylalkyl group may include a silylmethyl group, a dimethylsilylmethyl group (—$CH_2$—$Si(CH_3)_2H$), a trimethylsilylmethyl group (—$CH_2$—$Si(CH_3)_3$), etc., but is not limited thereto.

With regard to the metallocene compound according to the present disclosure, $R_1$ and $R_2$, and $R_5$ and $R_6$, in Chemical Formula 1 are preferably a hydrogen, a methyl group, an ethyl group, a propyl group, an isopropyl group, an n-butyl group, a tert-butyl group, a methoxymethyl group, a tert-butoxymethyl group, a 1-ethoxyethyl group, a 1-methyl-1-methoxyethyl group, a tert-butoxyhexyl group, a tetrahydropyranyl group, or a tetrahydrofuranyl group, but is not limited thereto.

Further, $R_3$ and $R_4$, and $R_7$ and $R_8$, of Chemical Formula 1 may be a hydrogen, a methyl group, an ethyl group, a propyl group, an isopropyl group, an n-butyl group, a tert-butyl group, a methoxymethyl group, a tert-butoxymethyl group, a 1-ethoxyethyl group, a 1-methyl-1-methoxyethyl group, a tert-butoxyhexyl group, a tetrahydropyranyl group, or a tetrahydrofuranyl group. Alternatively, $R_3$ and $R_4$, or $R_7$ and $R_8$, are connected to each other to be a phenyl group, a cyclohexyl group, etc. However, $R_3$ and $R_4$, and $R_7$ and $R_8$, are not limited to the above described substituents.

Meanwhile, in the present disclosure, when the compound of Chemical Formula 3a having a particular substituent is applied to one or more of $C_1$ and $C_2$ of Chemical Formula 2, it is possible to produce a polyolefin with high activity and to maintain excellent copolymerization property.

Preferably, $R_1$ to $R_{28}$ of Chemical Formulae 3a, 3b, 3c, and 3d are each independently hydrogen, a halogen, a methyl group, an ethyl group, a propyl group, an isopropyl group, an n-butyl group, a tert-butyl group, a pentyl group, a hexyl group, a heptyl group, an octyl group, an ethylene group, a propylene group, a butylene group, a phenyl group, a benzyl group, a naphthyl group, a halogen group, an ether group, a trimethylsilyl group, a triethylsilyl group, a tripropylsilyl group, a tributylsilyl group, a triisopropylsilyl group, a trimethylsilylmethyl group, a dimethylether group, a tert-butyldimethylsilylether group, a methoxy group, an ethoxy group, or a tert-butoxyhexyl group, but are not limited thereto.

Preferably, $Q_1$ and $Q_2$ of Chemical Formula 2 are hydrogen, a methyl group, an ethyl group, a propyl group, an isopropyl group, an n-butyl group, a tert-butyl group, a methoxymethyl group, a tert-butoxymethyl group, a 1-ethoxyethyl group, a 1-methyl-1-methoxyethyl group, a tert-butoxyhexyl group, a tetrahydropyranyl group, or a tetrahydrofuranyl group, but are not limited thereto.

Preferably, B of Chemical Formula 2 is silicon, but is not limited thereto.

Specifically, the metallocene compound of Chemical Formula 2 is characterized by including at least one C1 to C20 silylalkyl group such as a trimethylsilyl methyl group in the substituent of Chemical Formula 3a.

More specifically, an indene derivative of Chemical Formula 3a has relatively low electron density compared to an indenoindole derivative or a fluorenyl derivative, and includes a silylalkyl group with large steric hindrance. Therefore, due to steric hindrance effects and electron density factors, the metallocene compound may polymerize an olefin polymer having a relatively low molecular weight with high activity, compared to a metallocene compound having a similar structure.

Moreover, the indenoindole derivative which may be represented by Chemical Formula 3b, the fluorenyl derivative which may be represented by Chemical Formula 3c, and the indene derivative which may be represented by Chemical Formula 3d form a structure which is crosslinked by a bridge and have an unshared electron pair which can act as a Lewis base with respect to the structure of the ligand, thereby exhibiting high polymerization activity.

According to an embodiment of the present disclosure, a specific example of the functional group represented by Chemical Formula 3a may be a compound represented by any one of the following structural formulae, but the present disclosure is not limited thereto.

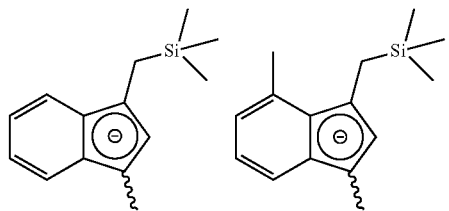

-continued
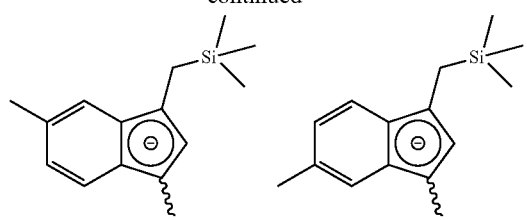
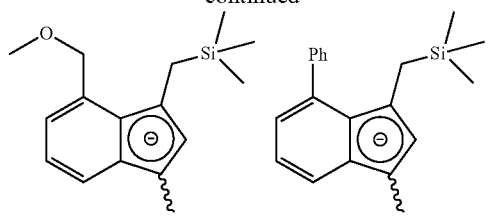
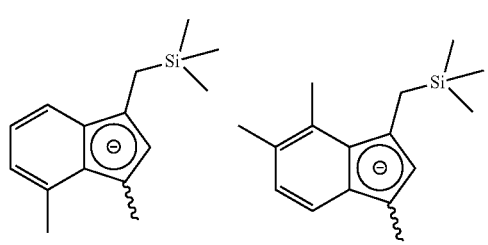
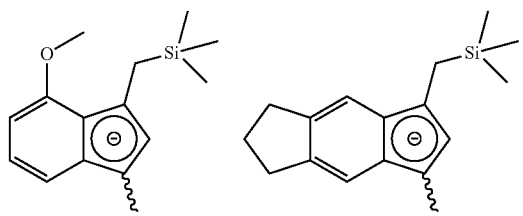
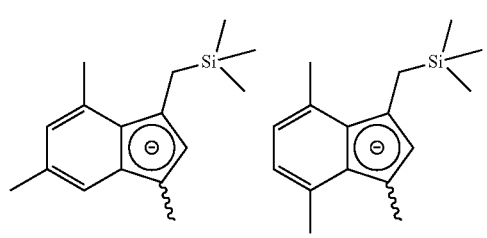
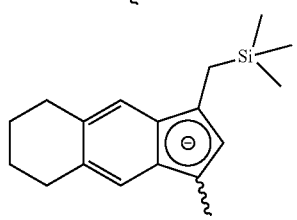
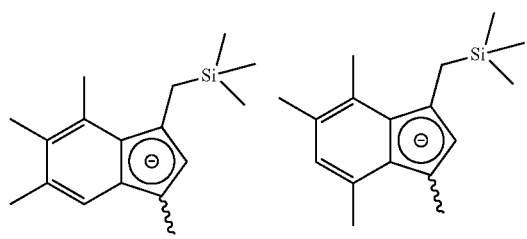
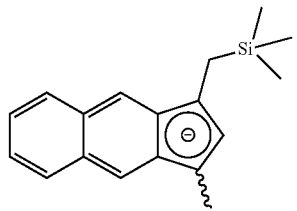
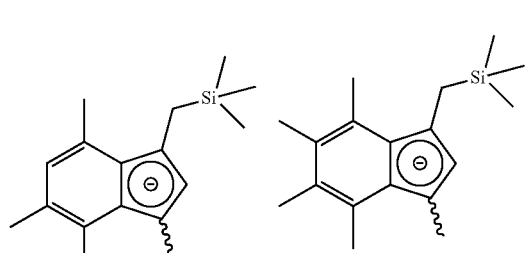
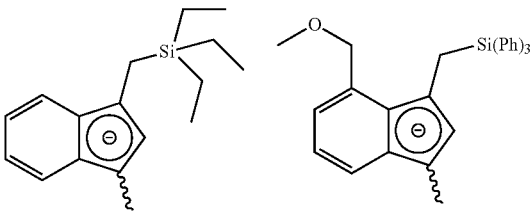
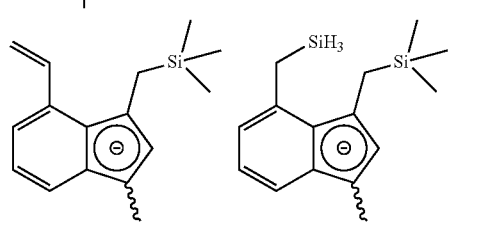
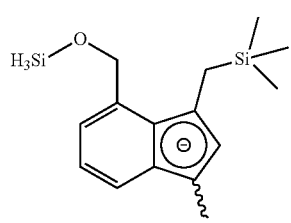
Further, a specific example of the functional group represented by Chemical Formula 3b may be a compound represented by any one of the following structural formulae, but the present disclosure is not limited thereto.
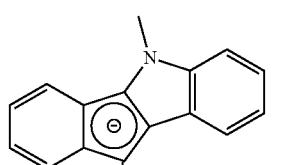
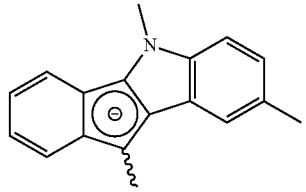

-continued
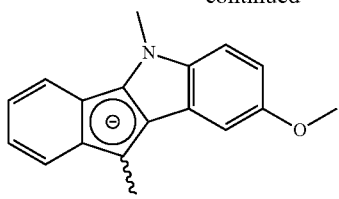
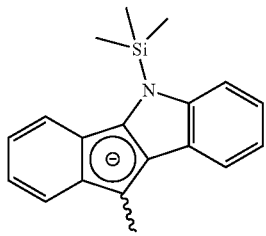
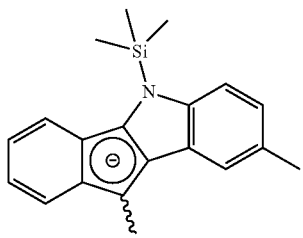
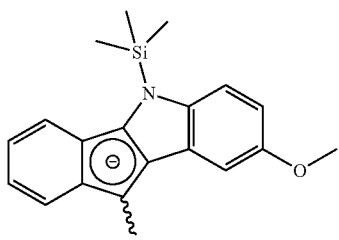
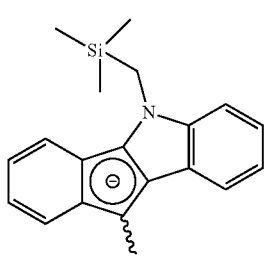
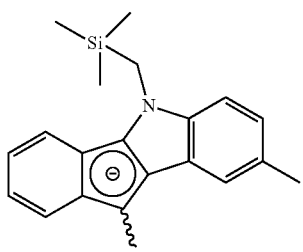
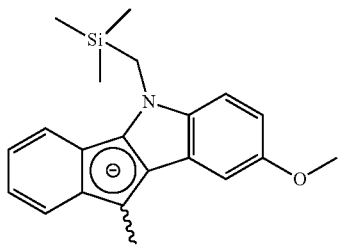
-continued
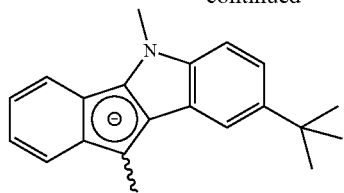
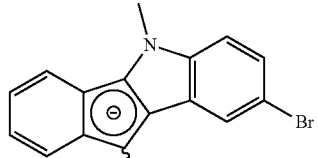
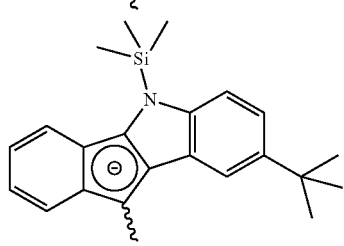
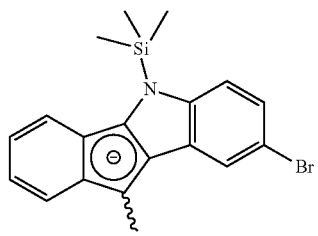
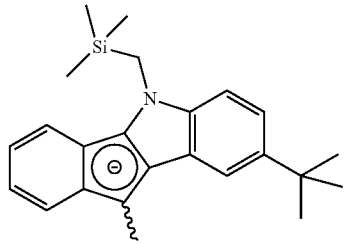
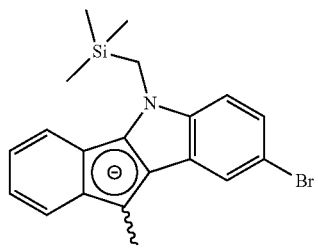
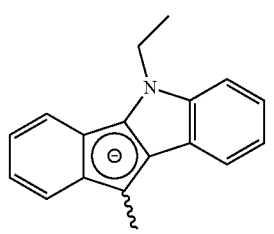

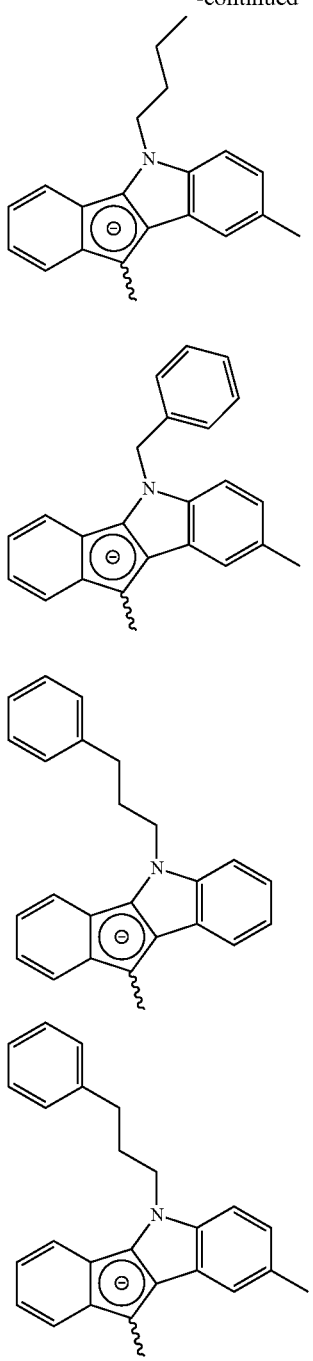
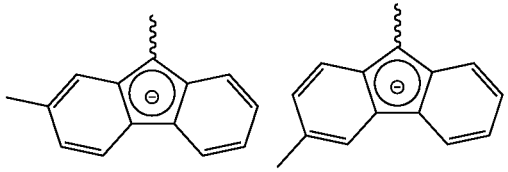
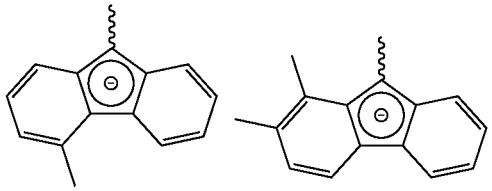
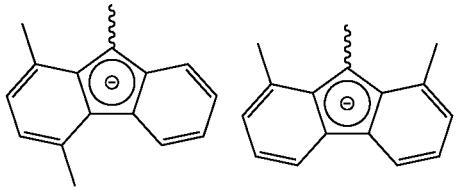
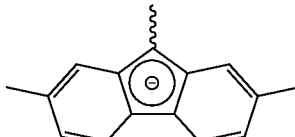
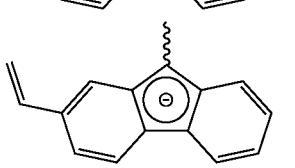
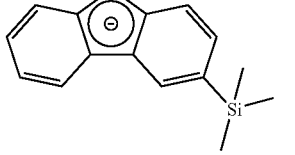
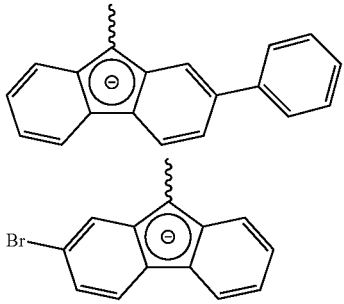
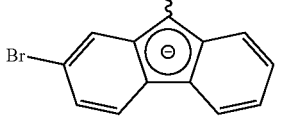
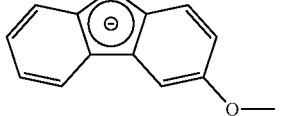
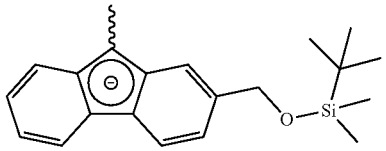
A specific example of the functional group represented by Chemical Formula 3c may be a compound represented by any one of the following structural formulae, but the present disclosure is not limited thereto.
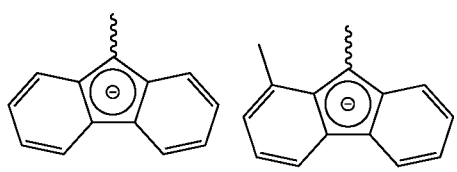

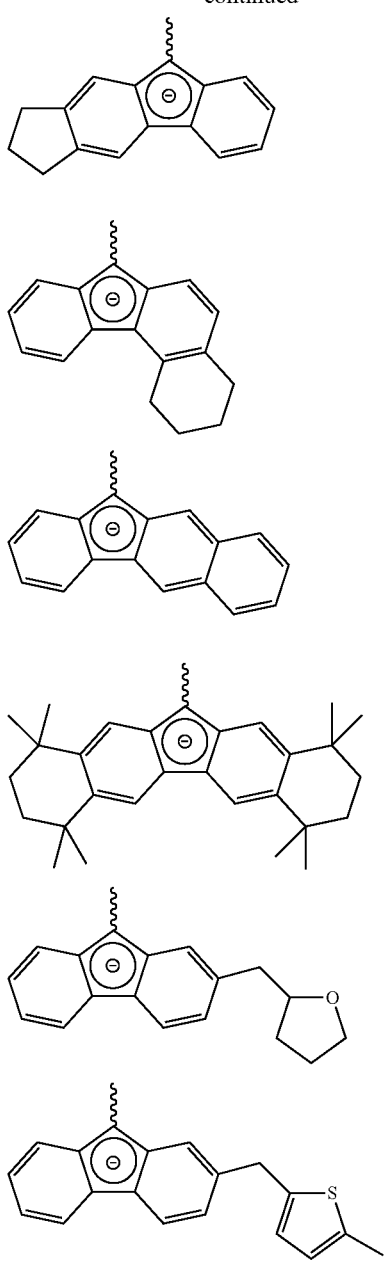
Further, a specific example of the functional group represented by Chemical Formula 3d may be a compound represented by any one of the following structural formulae, but the present disclosure is not limited thereto.
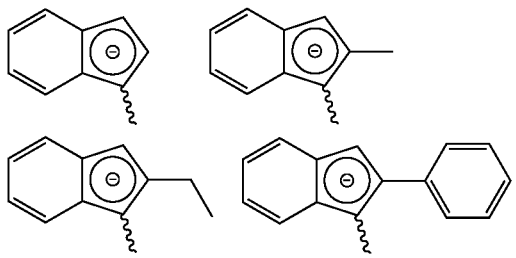
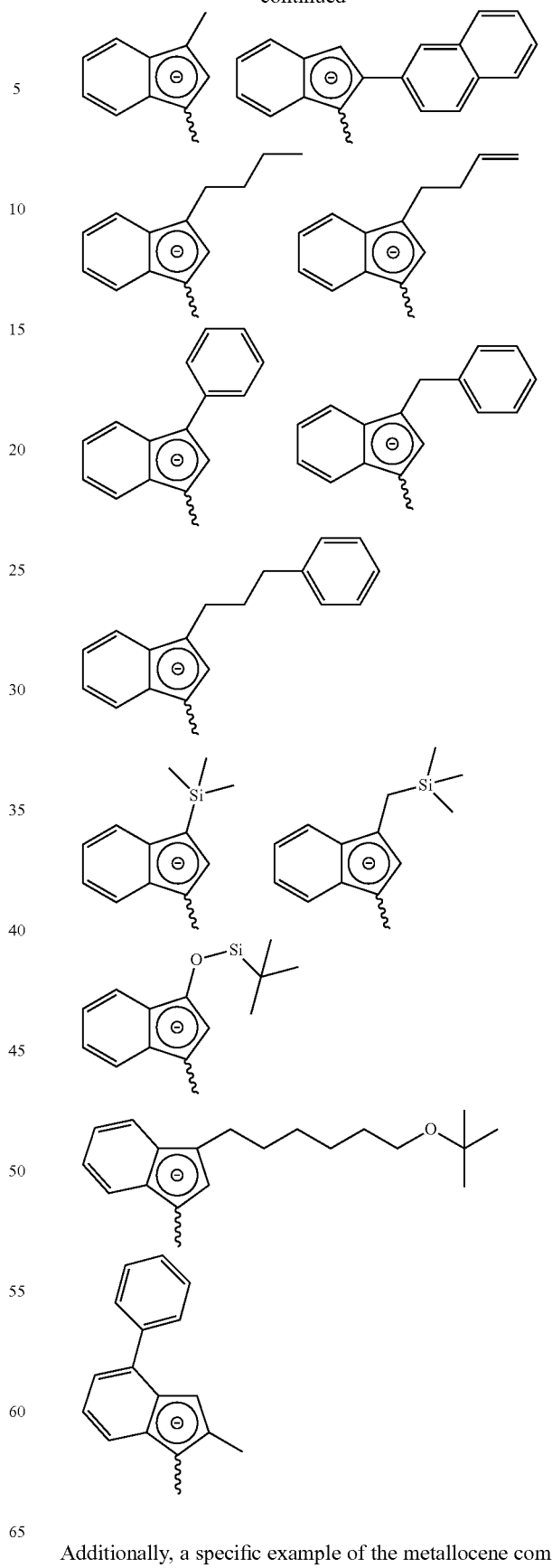
Additionally, a specific example of the metallocene compound represented by Chemical Formula 1 may be a compound represented by any one of the following structural formulae, but the present disclosure is not limited thereto.

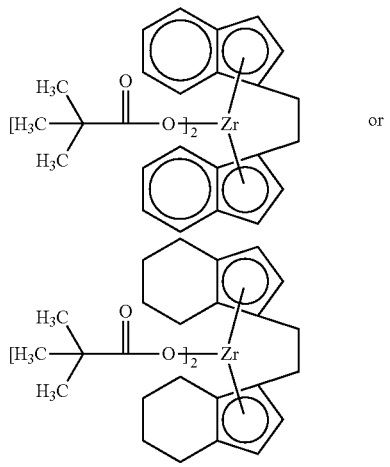

The metallocene compound of Chemical Formula 1 may have excellent activity and may polymerize olefinic polymers having a high molecular weight and a low molecular weight.

Further, a specific example of the metallocene compound represented by Chemical Formula 2 may be a compound represented by the following structural formula, but the present disclosure is not limited thereto.

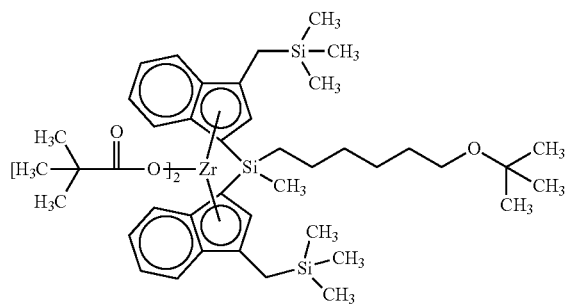

The metallocene compound of Chemical Formula 2 may have excellent activity and may polymerize olefinic polymers having a high molecular weight and a low molecular weight.

According to an embodiment of the present disclosure, the metallocene compound of Chemical Formula 2 may be obtained by connecting the indene derivative and a cyclopentadiene derivative with a bridge compound to prepare a ligand compound, and then carrying out metallation by injecting a metal precursor compound thereto, but is not limited to thereto.

More specifically, for example, the indene derivative is reacted with an organic lithium compound such as n-BuLi to prepare a lithium salt, which is mixed with a halogenated compound of the bridge compound, and then this mixture is reacted to prepare a ligand compound. The ligand compound or the lithium salt thereof is mixed with the metal precursor compound, and this mixture is allowed to react for about 12 hrs to 24 hrs until the reaction is completed, and then a reaction product is filtered and dried under reduced pressure to obtain the metallocene compound represented by Chemical Formula 1 or Chemical Formula 2. A method of preparing the metallocene compound of Chemical Formula 1 or Chemical Formula 2 will be concretely described in examples below.

The metallocene-supported catalyst of the present disclosure may further include one or more of cocatalyst compounds represented by the following Chemical Formula 4, Chemical Formula 5, and Chemical Formula 6, in addition to the above metallocene compound:

$$—[Al(R_{30})—O]_m—$$ [Chemical Formula 4]

wherein, in Chemical Formula 4, each $R_{30}$ may be the same as or different from each other, and are each independently a halogen, C1 to C20 hydrocarbon, or halogen-substituted C1 to C20 hydrocarbon, and m is an integer of 2 or more;

$$J(R_{31})_3$$ [Chemical Formula 5]

wherein, in Chemical Formula 5, each $R_{31}$ is the same as defined in Chemical Formula 4; and J is aluminum or boron;

$$[E-H]^+[ZA_4]^- \text{ or } [E]^+[ZA_4]^-$$ [Chemical Formula 6]

wherein, in Chemical Formula 6, E is a neutral or cationic Lewis base;

H is a hydrogen atom;

Z is Group 13 element; and

Each A may be the same as or different from each other, and are each independently a C6 to C20 aryl group or a C1 to C20 alkyl group, of which one or more hydrogen atoms is unsubstituted or substituted with a halogen, C1 to C20 hydrocarbon, an alkoxy, or a phenoxy.

Examples of the compound represented by Chemical Formula 4 may include methylaluminoxane, ethylaluminoxane, isobutylaluminoxane, butylaluminoxane, etc., and a more preferred compound is methylaluminoxane.

Examples of the compound represented by Chemical Formula 5 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, etc., and a more preferred compound is selected from trimethylaluminum, triethylaluminum, and triisobutylaluminum.

Examples of the compound represented by Chemical Formula 6 may include triethylammonium tetraphenylboron, tributylammonium tetraphenylboron, trimethylammonium tetraphenylboron, tripropylammonium tetraphenylboron, trimethylammonium tetra(p-tolyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetrapentafluorophenylboron, N,N-diethylanilinium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, triethylammonium tetraphenylaluminum, tributylammonium tetraphenylaluminum, trimethylammonium tetraphenylaluminum, tripropylammonium tetraphenylaluminum, trimethylammonium tetra(p-tolyl)aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra (p-trifluoromethylphenyl)aluminum, tributylammonium tetrapentafluorophenylaluminum, N,N-diethylanilinium tetraphenylaluminum, N,N-diethylanilinium tetrapentafluorophenylaluminum, diethylammonium tetrapentatetraphenylaluminum, triphenylphosphonium tetraphenylaluminum, trimethylphosphonium tetraphenylaluminum, tripropylammonium tetra(p-tolyl)boron, triethylammonium tetra(o,p-dimethylphenyl)boron, tributylammonium tetra(p-trifluoromethylphenyl)boron, triphenylcarbonium tetra(p-trifluoromethylphenyl)boron, triphenylcarbonium tetrapentafluorophenylboron, etc.

Preferably, alumoxane may be used, and more preferably, methylalumoxane (MAO), an alkyl alumoxane, may be used.

The metallocene-supported catalyst according to the present disclosure may be prepared by a first method including 1) contacting the metallocene compound represented by Chemical Formula 1 or Chemical Formula 2 with the compound represented by Chemical Formula 4 or Chemical Formula 5 to obtain a mixture, and 2) adding the compound represented by Chemical Formula 6 to the mixture.

Furthermore, the metallocene-supported catalyst according to the present disclosure may be prepared by a second method of contacting the metallocene compound represented by Chemical Formula 1 or Chemical Formula 2 with the compound represented by Chemical Formula 4.

In the first method of preparing the supported catalyst, a molar ratio of the metallocene compound represented by Chemical Formula 1 or Chemical Formula 2/the compound represented by Chemical Formula 4 or Chemical Formula 5 is preferably 1/5000 to 1/2, more preferably 1/1000 to 1/10, and most preferably 1/500 to 1/20. When the molar ratio of the metallocene compound represented by Chemical Formula 1 or Chemical Formula 2/the compound represented by Chemical Formula 4 or Chemical Formula 5 exceeds 1/2, there is a problem that the alkylating agent is very small in quantity and the metal compound is not completely alkylated. When the molar ratio is less than 1/5,000, the alkylation of the metal compound is accomplished, but there is a problem that the alkylated metal compound is not completely activated due to a side reaction between the remaining excess alkylating agent and an activator of Chemical Formula 5. Furthermore, a molar ratio of the metallocene compound represented by Chemical Formula 1 or Chemical Formula 2/the compound represented by Chemical Formula 6 is preferably 1/25 to 1, more preferably 1/10 to 1, and most preferably 1/5 to 1. When the molar ratio of the metallocene compound represented by Chemical Formula 1 or Chemical Formula 2/the compound represented by Chemical Formula 6 exceeds 1, there is a problem that the activity of the prepared supported catalyst is deteriorated because the activator is relatively small in quantity and the metal compound is not completely activated. When the molar ratio is less than 1/25, the activation of the metal compound is completely accomplished, but there is a problem that cost of the supported catalyst is not economical or purity of the polymer to be prepared is decreased due to remaining excess activator.

In the second method of preparing the supported catalyst, a molar ratio of the metallocene compound represented by Chemical Formula 1 or Chemical Formula 2/the compound represented by Chemical Formula 4 is preferably 1/10000 to 1/10, more preferably 1/5000 to 1/100, and most preferably 1/3000 to 1/500. When the molar ratio exceeds 1/10, there is a problem that the activity of the prepared supported catalyst is deteriorated because the activator is relatively small in quantity and the metal compound is not completely activated. When the molar ratio is less than 1/10000, the activation of the metal compound is completely accomplished, but there is a problem that cost of the supported catalyst is not economical or purity of the polymer to be prepared is decreased due to remaining excess activator.

As a reaction solvent used for preparing the supported catalyst, a hydrocarbon solvent such as pentane, hexane, heptane, etc., or an aromatic solvent such as benzene, toluene, etc. may be used.

Furthermore, the supported catalyst may include the metallocene compound and the cocatalyst compound in the form of being supported on a support.

When the metallocene compound and the cocatalyst compound are used in the form of being supported on a support, the metallocene compound may be included in an amount of about 0.5 parts by weight to about 20 parts by weight and the cocatalyst may be included in an amount of about 1 part by weight to about 1000 parts by weight, based on 100 parts by weight of the support. Preferably, the metallocene compound may be included in an amount of about 1 part by weight to about 15 parts by weight and the cocatalyst may be included in an amount of about 10 parts by weight to about 500 parts by weight, based on 100 parts by weight of the support. Most preferably, the metallocene compound may be included in an amount of about 1 part by weight to about 100 parts by weight and the cocatalyst may be included in an amount of about 40 parts by weight to about 150 parts by weight, based on 100 parts by weight of the support.

In the metallocene-supported catalyst of the present disclosure, a weight ratio of the total transition metals included in the metallocene compound to the support may be 1:10 to 1:1000. When the support and the metallocene compound are included at the above weight ratio, an optimal shape may be obtained. Further, a weight ratio of the cocatalyst compound to the support may be 1:1 to 1:100. When the cocatalyst and the metallocene compound are included at the above weight ratio, activity and a microstructure of the polymer may be optimized.

Meanwhile, as long as the support is a metal, a metal salt, or a metal oxide which is commonly used in supported catalysts, there is no limitation in the constitution thereof. Specifically, the support may include any support selected from the group consisting of silica, silica-alumina, and silica-magnesia. The support may be dried at a high temperature. Generally, the support may include an oxide, a carbonate, a sulfate, or a nitrate of a metal, such as $Na_2O$, $K_2CO_3$, $BaSO_4$, $Mg(NO_3)_2$, etc.

An amount of hydroxy groups (—OH) on the surface of the support is preferably as small as possible, but it is practically difficult to eliminate all hydroxy groups. The amount of hydroxy groups may be controlled by the preparation method, the preparation conditions, the drying conditions (temperature, time, drying method, etc.), etc. of the support, and the amount is preferably 0.1 mmol/g to 10 mmol/g, more preferably 0.1 mmol/g to 1 mmol/g, and further preferably 0.1 mmol/g to 0.5 mmol/g. In order to reduce a side-reaction by a few hydroxy groups which remain after drying, a support, from which hydroxy groups are chemically eliminated while preserving highly reactive siloxane groups that participate in supporting, may be used.

The metallocene-supported catalyst according to the present disclosure may be used as it is in the polymerization of olefinic monomers. Also, the metallocene-supported catalyst according to the present disclosure may be prepared as a pre-polymerized catalyst by contacting the catalyst with an olefinic monomer. For example, it may be prepared as a pre-polymerized catalyst by contacting the catalyst with an olefinic monomer such as ethylene, propylene, 1-butene, 1-hexene, 1-octene, etc.

The metallocene-supported catalyst according to the present disclosure is prepared, for example, by supporting the cocatalyst compound on the support, and supporting the metallocene compound represented by Chemical Formula 1 or Chemical Formula 2 on the support. Between the respective supporting steps, washing with a solvent may be additionally carried out.

The process of preparing the metallocene-supported catalyst as above may be carried out at a temperature of about 0° C. to about 100° C. under atmospheric pressure, but is not limited thereto.

Meanwhile, the present disclosure provides a method of preparing a polyolefin by polymerizing olefinic monomers in the presence of the metallocene-supported catalyst, and a polyolefin prepared by the above preparation method.

The olefinic monomer may include ethylene, alpha-olefin, cyclic olefin, diene olefin, or triene olefin having two or more double bonds.

Specific examples of the olefinic monomer may include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, 3-chloromethylstyrene, etc., and these monomers may be copolymerized by mixing two or more thereof.

The polymerization reaction may be carried out by a solution polymerization process, a slurry process, or a gas phase process using one continuous slurry polymerization reactor, loop slurry reactor, gas phase reactor, or solution reactor. Further, the polymerization reaction may be carried out by homopolymerizing one type of olefinic monomer or copolymerizing two or more types of monomers.

The metallocene-supported catalyst may be injected after being dissolved or diluted in an aliphatic hydrocarbon solvent having 5 to 12 carbon atoms, for example, pentane, hexane, heptane, nonane, decane, and isomers thereof, an aromatic hydrocarbon solvent such as toluene and benzene, or a hydrocarbon solvent substituted with a chlorine atom such as dichloromethane and chlorobenzene. The solvent is used, preferably, after removing a small amount of water, air or the like acting as a catalyst poison by treatment of a small amount of alkyl aluminum. It is also possible to use an additional cocatalyst.

The polymerization of the olefinic monomer may be carried out at a temperature of about 25° C. to about 500° C. and a pressure of about 1 kgf/cm$^2$ to about 100 kgf/cm$^2$ for about 1 hr to about 24 hrs. Specifically, the polymerization of the olefinic monomer may be carried out at a temperature of about 25° C. to about 500° C., preferably about 25° C. to about 200° C., and more preferably about 50° C. to about 100° C. Furthermore, the reaction pressure may be about 1 kgf/cm$^2$ to about 100 kgf/cm$^2$, preferably about 1 kgf/cm$^2$ to about 50 kgf/cm$^2$, and more preferably about 5 kgf/cm$^2$ to about 40 kgf/cm$^2$.

The metallocene-supported catalyst of the present disclosure may effectively polymerize olefinic monomers with very excellent activity. Particularly, the activity of the metallocene-supported catalyst may be 3.6 kg/gCat·hr or more, or 3.6 kg/gCat·hr to 30 kg/gCat·hr, preferably, 3.85 kg/gCat·hr or more or 3.9 kg/gCat·hr or more, and more preferably, 4.3 kg/gCat·hr or more, as calculated by a ratio of the weight (kg) of the produced polymer per unit weight (g) of the used catalyst per unit time (hr).

According to an embodiment of the present invention, a highly efficient catalyst having improved activity and bulk density (BD) may be developed by introducing a particular pivalate group into the metallocene compound. When the metallocene catalyst of the present disclosure is applied to a polymerization process, economic benefits due to high activity and productivity improvement due to control of polymer morphology may be expected.

The polyolefin prepared according to the present disclosure may be a polyethylene polymer, but is not limited thereto.

In the case where the polyolefin is an ethylene/alpha-olefin copolymer, a content of alpha-olefin as a comonomer is not particularly limited, and it may be adequately selected according to the use or purpose of the polyolefin. More specifically, the content may be more than 0 mole % and 99 mole % or less.

The prepared polyolefin may have a high molecular weight and a low molecular weight owing to relatively high activity and excellent comonomer reactivity of the catalyst, compared to polyolefins prepared by using an organometallic compound of a similar structure.

According to an embodiment of the present invention, the olefinic polymer may have a weight average molecular weight (Mw) of about 10,000 g/mol to about 2,000,000 g/mol. Here, the olefinic polymer may have a molecular weight distribution (Mw/Mn) of about 1 to about 10, preferably about 3 to about 6. Further, the olefinic polymer may a density of 0.910 g/mL to 0.960 g/mL.

In particular, the olefinic polymer may have a bulk density (BD) of 0.29 g/mL or more, or 0.29 g/mL to 0.35 g/mL, and preferably 0.30 g/mL or more. Improvement of the bulk density (BD) is associated with settling efficient (SE) in a slurry process, and SE improvement allows productivity improvement and stable process operation. Therefore, it can be seen that BD improvement is a very important effect.

Hereinafter, preferred examples are provided for better understanding of the present disclosure. However, the following examples are provided for illustrative purposes only and the present disclosure is not intended to be limited by these examples.

EXAMPLE

Preparation Example of Metallocene Compound

Synthesis Example 1: Precursor A

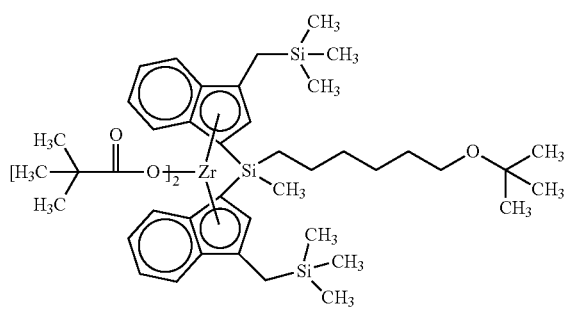

1-1 Preparation of Ligand Compound 4.05 g (20 mmol) of ((1H-inden-3-yl)methyl)trimethylsilane was injected into a dried 250 mL Schlenk flask and dissolved in 40 mL of diethylether under an argon atmosphere. After this solution was cooled down to 0° C., 9.6 mL (24 mmol) of 1.2 equivalent weights of 2.5 M n-BuLi dissolved in hexane was slowly added dropwise thereto. This reaction mixture was slowly warmed up to room temperature, and stirred for 24 hrs. In another 250 mL Schlenk flask, a solution was prepared by dissolving 2.713 g (10 mmol) of silicone tether in 30 mL of hexane and cooled down to −78° C., and the above prepared mixture was slowly added dropwise thereto. Thereafter, the mixture was gradually warmed up to room temperature, and stirred for 24 hrs. 50 mL of water was added thereto, and an organic layer was extracted with 50 mL of ether three times. To the collected organic layer, an appropriate amount of $MgSO_4$ was added, stirred for a while, and filtered, and the solvent was dried under reduced pressure. As a result, 6.1 g (molecular weight: 603.11, 10.05 mmol, yield: 100.5%) of a ligand compound in the form of a yellow oil was obtained. The obtained ligand compound was used in the preparation of metallocene compounds without further separation procedure.

$^1$H NMR (500 MHz, $CDCl_3$): 0.02 (18H, m), 0.82 (3H, m), 1.15 (3H, m), 1.17 (9H, m), 1.42 (H, m), 1.96 (2H, m), 2.02 (2H, m), 3.21 (2H, m), 3.31 (1H, s), 5.86 (1H, m), 6.10 (1H, m), 7.14 (3H, m), 7.14 (2H, m) 7.32 (3H, m).

1-2 Preparation of Metallocene Compound Precursor

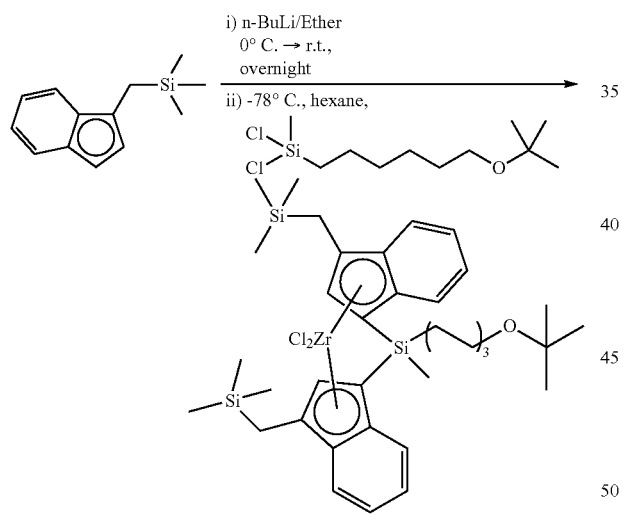

The ligand compound synthesized in 1-1 was added to a 250 mL Schlenk flask dried in an oven, and then dissolved in 4 equivalent weights of methyl tert-butyl ether and 60 mL of toluene, to which 2 equivalent weights of n-BuLi hexane solution was added for lithiation. After one day, all solvent in the flask was removed under a vacuum condition, and the resultant was dissolved in an equal amount of toluene. Also, in a glove box, one equivalent weight of $ZrCl_4(THF)_2$ was added in a 250 mL Schlenk flask, and then toluene was injected into the flask to prepare a suspension. The above two flasks were cooled down to −78° C., and then the lithiated ligand compound was slowly added to the toluene suspension of $ZrCl_4(THF)_2$. After completion of the injection, the reaction mixture was slowly warmed up to room temperature, stirred for one day and allowed to carry out the reaction. Then, toluene in the mixture was removed to a volume of about 1/5 through vacuum decompression. Hexane of about 5 times the volume of the remaining toluene was added thereto and the mixture was recrystallized. The resultant was filtered without contacting with the outside air to give a metallocene compound. The resulting filter cake in the upper portion of the filter was washed using a small amount of hexane, and then weighed in the glove box to identify the synthesis, yield, and purity.

As a result, 7.3 g (9.56 mmol, 95.6%) of a purple oil was obtained from 6.1 g (10 mmol) of the ligand compound, and was stored in a toluene solution (purity: 100%, molecular weight: 763.23).

$^1$H NMR (500 MHz, $CDCl_3$): 0.03 (18H, m), 0.98, 1.28 (3H, d), 1.40 (9H, m), 1.45 (4H, m), 1.66 (6H, m), 2.43 (4H, s), 3.47 (2H, m), 5.34 (1H, m), 5.56 (1H, m), 6.95 (1H, m), 6.97 (1H, m), 6.98 (1H, m), 7.22 (1H, m), 7.36 (2H, m), 7.43 (1H, m), 7.57 (1H, m)

1-3 Preparation of Metallocene Compound

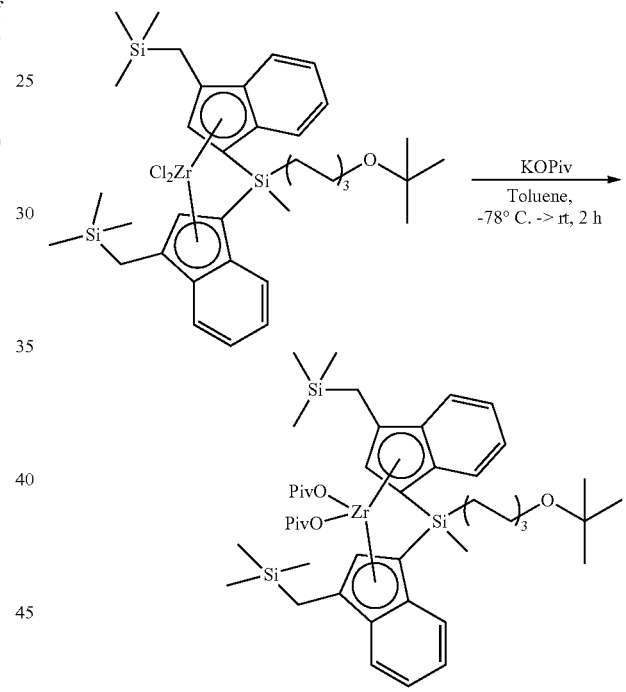

1.52 g (2 mmol) of the metallocene compound precursor prepared in 1-2 was added to a 250 mL Schlenk flask dried in an oven, and then diluted with 40 mL of dry toluene. This solution was cooled down to −78° C., and then 840 mg (6 mmol, 3 equivalent weights) of potassium pivalate was added thereto under an argon atmosphere. When this reaction mixture was gradually warmed up to room temperature, the color of the solution changed from red to yellow as the reaction proceeded. This reaction mixture was further stirred for about 2 hours, and then passed through a celite pad under an argon atmosphere to remove the residual potassium pivalate and inorganic materials. A solvent was removed from a filtrate under reduced pressure to obtain a light yellow compound with a yield of 80%.

$^1$H NMR (500 MHz, $CDCl_3$): 0.05-0.24 (18H, m), 0.89-0.92 (3H, m), 1.28-1.43 (31H, m), 1.50-1.62 (4H, m), 2.17-2.23 (2H, m), 2.46 (4H, s), 3.34 (2H, m), 6.32 (2H, m), 6.67 (2H, m), 7.14-7.38 (8H, m)

Synthesis Example 2: Precursor B

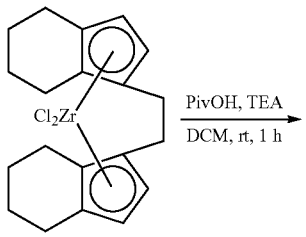

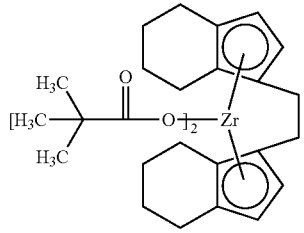

As a metallocene compound precursor, dichloro[rac-ethylenebis(4,5,6,7-tetrahydro-1-indenyl)]zirconium(IV) was procured (purchased from Sigma-Aldrich, Cas Number 100163-29-9). 2.13 g (5 mmol) of the metallocene compound precursor was added to a 250 mL Schlenk flask dried in an oven. Under an argon atmosphere, 1.02 g (10 mmol) of pivalic acid was added thereto, and dissolved in 50 mL of dichloromethane. This reaction mixture was cooled down to 0° C., and then 1.4 mL (10 mmol) of triethylamine was slowly injected thereto. A bath was removed, and the reaction mixture was gradually warmed up to room temperature. Within 30 minutes, a yellow color disappeared and it turned to a white color. After about 1 hr, the reaction solvent was completely removed under reduced pressure, and 100 mL of ether was added to completely dissolve a white solid by sonication. The mixture in the flask was filtered under an argon atmosphere to obtain a colorless ether filtrate. This filtrate was completely dried to obtain 2.65 g (yield of about 90%) of a white solid.

$^1$H NMR (500 MHz, CDCl$_3$): 1.19 (18H, s), 1.41-1.58 (4H, m), 1.72-1.79 (2H, m), 1.81-1.88 (2H, m), 2.21-2.25 (2H, m), 2.33-2.39 (2H, m), 2.52-2.60 (2H, m), 2.82-2.88 (2H, m), 3.03-3.16 (4H, m), 5.57 (2H, s), 5.92 (2H, s)

Synthesis Example 3: Precursor C

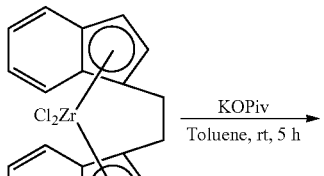

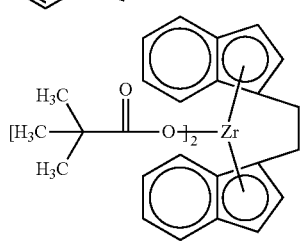

As a metallocene compound precursor, dichloro[rac-ethylene bis(indenyl)]zirconium(IV) was procured (purchased from Sigma-Aldrich, CAS Number 100080-82-8). 2.05 g (5 mmol) of the metallocene compound precursor was added to a 250 mL Schlenk flask dried in an oven, and then 60 mL of dry toluene was added thereto to prepare a suspension. Under an argon atmosphere, 2.11 g (15 mmol, 3 equivalent weights) of potassium pivalate was thereto, and within about 2 hrs, floating materials disappeared, and the solution turned clear yellow. This reaction mixture was further stirred for about 3 hours, and then passed through a celite pad under an argon atmosphere to remove residual potassium pivalate and inorganic materials. A solvent was removed from a resulting filtrate under reduced pressure and recrystallized with pentane to obtain a light yellow compound with a yield of 50% to 60%.

$^1$H NMR (500 MHz, CDCl$_3$): 0.98-1.22 (18H, m), 3.34 (4H, s), 6.61 (2H, m), 6.83 (2H, m), 7.26-7.35 (4H, m), 7.37-7.41 (2H, m), 7.43-7.48 (1H, m), 7.54-7.58 (1H, m)

Comparative Synthesis Example 1: Precursor E

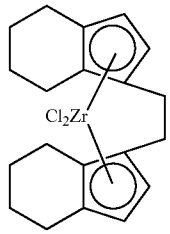

A metallocene compound having the above structural formula, dichloro[rac-ethylenebis(4,5,6,7-tetrahydro-1-indenyl)]zirconium(IV) was procured (purchased from Sigma-Aldrich, Cas Number 100163-29-9).

Comparative Synthesis Example 2: Precursor F

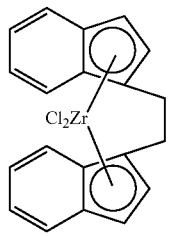

A metallocene compound having the above structural formula, dichloro[rac-ethylene bis(indenyl)]zirconium(IV) was procured (purchased from Sigma-Aldrich, CAS Number 100080-82-8).

Comparative Synthesis Example 3: Precursor D

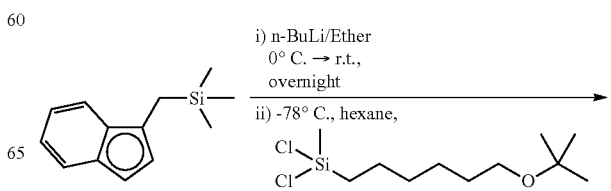

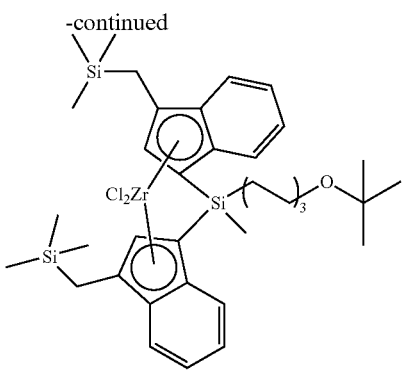

6-1 Preparation of Ligand Compound 4.05 g (20 mmol) of ((1H-inden-3-yl)methyl)trimethylsilane was injected into a dried 250 mL Schlenk flask and dissolved in 40 mL of diethylether under an argon atmosphere. After this solution was cooled down to 0° C., 9.6 mL (24 mmol) of 1.2 equivalent weights of 2.5 M n-BuLi dissolved in hexane was slowly added dropwise. This reaction mixture was slowly warmed up to room temperature, and stirred for 24 hrs. In another 250 ml Schlenk flask, a solution was prepared by dissolving 2.713 g (10 mmol) of a silicone tether in 30 mL of hexane and cooled down to −78° C., and the above prepared mixture was slowly added dropwise thereto. Thereafter, the mixture was gradually warmed up to room temperature, and stirred for 24 hrs. 50 mL of water was added thereto, and an organic layer was extracted with 50 mL of ether three times. To the collected organic layer, an appropriate amount of $MgSO_4$ was added, and stirred for a while. The mixture was filtered, and the solvent of the filtrate was dried under reduced pressure. Then, 6.1 g (molecular weight: 603.11, 10.05 mmol, yield: 100.5%) of a ligand compound in the form of a yellow oil was obtained. The obtained ligand compound was used in the preparation of metallocene compounds without a further separation procedure.

$^1$H NMR (500 MHz, $CDCl_3$): 0.02 (18H, m), 0.82 (3H, m), 1.15 (3H, m), 1.17 (9H, m), 1.42 (H, m), 1.96 (2H, m), 2.02 (2H, m), 3.21 (2H, m), 3.31 (1H, s), 5.86 (1H, m), 6.10 (1H, m), 7.14 (3H, m), 7.14 (2H, m) 7.32 (3H, m).

6-2 Preparation of Metallocene Compound

The ligand compound synthesized in 6-1 was added to a 250 mL Schlenk flask dried in an oven, and then dissolved in 4 equivalent weights of methyl tert-butyl ether and 60 mL of toluene, to which 2 equivalent weights of n-BuLi hexane solution was added for lithiation. After one day, all solvent in the flask was removed under a vacuum condition, and the resultant was dissolved in an equal amount of toluene. Also, in a glove box, one equivalent weight of $ZrCl_4(THF)_2$ was added in a 250 mL Schlenk flask, and then toluene was injected into the flask to prepare a suspension. The above two flasks were cooled down to −78° C., and then the lithiated ligand compound was slowly added to the toluene suspension of $ZrCl_4(THF)_2$. After completion of the injection, the reaction mixture was slowly warmed up to room temperature, stirred for one day and allowed to react. Then, toluene in the mixture was removed to a volume of about 1/5 through vacuum/reduced pressure. Hexane of about 5 times the volume of the remaining toluene was added thereto and the mixture was recrystallized. The resultant was filtered without contacting with the outside air to give a metallocene compound. The resulting filter cake in the upper portion of the filter was washed using a small amount of hexane, and then weighed in the glove box to identify the synthesis, yield, and purity.

As a result, 7.3 g (9.56 mmol, 95.6%) of a purple oil was obtained from 6.1 g (10 mmol) of the ligand compound, and was stored in a toluene solution. (purity: 100%, molecular weight: 763.23)

$^1$H NMR (500 MHz, $CDCl_3$): 0.03 (18H, m), 0.98, 1.28 (3H, d), 1.40 (9H, m), 1.45 (4H, m), 1.66 (6H, m), 2.43 (4H, s), 3.47 (2H, m), 5.34 (1H, m), 5.56 (1H, m), 6.95 (1H, m), 6.97 (1H, m), 6.98 (1H, m), 7.22 (1H, m), 7.36 (2H, m), 7.43 (1H, m), 7.57 (1H, m)

Comparative Synthesis Example 4: Precursor G

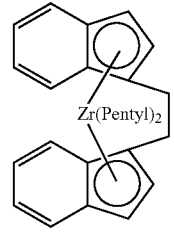

2.13 g (5 mmol) of the precursor D compound of Comparative Synthesis Example 3 was added to a 250 mL Schlenk flask dried in an oven, and then dissolved in a sufficient amount (about 100 mL) of THF. 5 mL (10 mmol) of pentyl magnesium bromide (2.0 M solution in ether) was slowly added thereto, and then stirred for one day. This reaction mixture was filtered under an argon atmosphere to remove a white solid, and a resulting yellow filtrate was dried under reduced pressure, and then washed with hexane to obtain a white solid.

$^1$H NMR (500 MHz, $CDCl_3$): 1.20 (6H, m), 1.64 (4H, m), 1.92 (4H, m), 2.42 (2H, m), 2.63 (2H, m), 2.71 (2H, m), 3.11-3.19 (2H, m), 3.53 (2H, m), 5.60 (2H, s), 6.58 (2H, s)

Preparation Example of Supported Catalyst

Catalyst Example 1

1.77 g of the catalyst precursor structure A prepared in Synthesis Example 1, 30 mL of toluene, 0.22 g of TIBAL, and 54 g of 10 wt % MAO were added to a 250 mL Schlenk flask, and then allowed to react at room temperature for 15 minutes. 100 mL of toluene was added to a 300 mL glass reactor, 10 g of silica (Grace Davison, SP952X calcined at 200° C.) was added thereto at 40° C., and stirred (500 rpm) for 30 min, and then allowed to stand. The solution prepared in the 250 mL flask was added to a glass reactor, heated to 80° C., and allowed to react for 6 hrs while stirring it. The the reactor was cooled down to room temperature, and then stirring was stopped, followed by settling for 10 min and decantation. 100 mL of hexane was injected into the reactor, the hexane slurry was transferred to a Schlenk flask, and the hexane solution was subjected to decantation. The resultant was dried at room temperature under reduced pressure for 3 hrs.

Catalyst Example 2

A supported catalyst was prepared in the same manner as in Catalyst Example 1, except that 0.56 g of the catalyst precursor structure B prepared in Synthesis Example 2 was used.

Catalyst Example 3

A supported catalyst was prepared in the same manner as in Catalyst Example 1, except that 0.55 g of the catalyst precursor structure C prepared in Synthesis Example 3 was used.

Catalyst Example 4

0.44 g of the catalyst precursor structure A prepared in Synthesis Example 1, 0.42 g of the catalyst precursor structure B prepared in Synthesis Example 2, 30 mL of toluene, 0.22 g of TIBAL, and 54 g of 10 wt % MAO were added to a 250 mL Schlenk flask, and then allowed to react at room temperature for 15 minutes. 100 mL of toluene was added to a 300 mL glass reactor, 10 g of silica (Grace Davison, SP952X calcined at 200° C.) was added thereto at 40° C., and stirred for 30 min (500 rpm), and then allowed to stand. The solution prepared in the 250 mL flask was added to a glass reactor, heated up to 80° C., and allowed to react for 6 hrs while stirring it. The reactor was cooled down to room temperature, and then stirring was stopped, followed by settling for 10 min and decantation. 100 mL of hexane was injected to the reactor, the hexane slurry was transferred to a Schlenk flask, and the hexane solution was subjected to decantation. The resultant was dried at room temperature under reduced pressure for 3 hrs.

Catalyst Example 5

100 mL of toluene was injected to a 300 mL BSR (Bench Scale Reactor), and 10 g of silica (Grace Davison, SP952X calcined at 200° C.) was added thereto at 40° C., and stirred for 30 min (500 rpm). 54 g of 10 wt % MAO were added thereto, and the temperature was raised up to 70° C., and allowed to react for 12 hrs while stirring it. The reactor was cooled down to 40° C. and stirring was stopped, followed by settling for 10 min and decantation. 100 mL of toluene was injected into the reactor, followed by stirring for 10 min, settling for 10 min, and decantation. 100 mL of toluene was injected thereto, and then 1.77 of the catalyst precursor A prepared in Synthesis Example 1 was mixed with toluene, this mixture was injected to the reactor, and allowed to react while stirring (500 rpm) for 1.5 hrs. The reactor was cooled down to room temperature, and stirring was stopped, followed by settling for 10 min and decantation. 100 mL of hexane was injected into the reactor, and the hexane slurry was transferred to a Schlenk flask, and the hexane solution was subjected to decantation. The resultant was dried at room temperature under reduced pressure for 3 hrs.

Catalyst Example 6

A supported catalyst was prepared in the same manner as in Catalyst Example 5, except that 0.56 g of the catalyst precursor structure B prepared in Synthesis Example 2 was used.

Comparative Catalyst Example 1

0.43 g of the catalyst precursor structure E prepared in Comparative Synthesis Example 1, 30 mL of toluene, 0.22 g of TIBAL, and 54 g of 10 wt % MAO were added to a 250 mL Schlenk flask, and then allowed to react at room temperature for 15 minutes. 100 mL of toluene was added to a 300 mL glass reactor, 10 g of silica (Grace Davison, SP952X calcined at 200° C.) was added thereto at 40° C., and stirred for 30 min (500 rpm), and then allowed to stand. The solution prepared in the 250 mL flask was injected to a glass reactor, and heated to 80° C., and allowed to react for 6 hrs while stirring it. The reactor was cooled down to room temperature, and then stirring was stopped, followed by settling for 10 min and decantation. 100 mL of hexane was injected into the reactor, the hexane slurry was transferred to a Schlenk flask, and the hexane solution was subjected to decantation. The resultant was dried at room temperature under reduced pressure for 3 hrs.

Comparative Catalyst Example 2

A supported catalyst was prepared in the same manner as in Comparative Catalyst Example 1, except that 0.42 g of the catalyst precursor structure F prepared in Comparative Synthesis Example 2 was used.

Comparative Catalyst Example 3

100 mL of toluene was injected to a 300 mL BSR (Bench Scale Reactor), and 10 g of silica (Grace Davison, SP952X calcined at 200° C.) was added thereto at 40° C., and it was stirred for 30 min (500 rpm). 54 g of 10 wt % MAO was injected into the reactor, the temperature was raised up to 70° C., and allowed to react for 12 hrs while stirring. The reactor was cooled down to 40° C. and stirring was stopped, followed by settling for 10 min and decantation. 100 mL of toluene was injected into the reactor, followed by stirring for 10 min, settling for 10 min, and decantation. 0.43 g of the catalyst precursor E prepared in Comparative Synthesis Example 1 was mixed with 100 mL of toluene, and the mixture was injected into the reactor. Then, the reactant was stirred for 1.5 hrs (500 rpm). The reactor was cooled down to room temperature, and stirring was stopped, followed by settling for 10 min and decantation. 100 mL of hexane was injected into the reactor, the hexane slurry was transferred to a Schlenk flask, and the hexane solution was subjected to decantation. The resultant was dried at room temperature under reduced pressure for 3 hrs.

Comparative Catalyst Example 4

100 mL of toluene was injected into a 300 mL BSR (Bench Scale Reactor), and 10 g of silica (Grace Davison, SP952X calcined at 200° C.) was added thereto at 40° C., and stirred (500 rpm) for 30 min. 54 g of 10 wt % MAO was injected thereto, and the temperature was raised up to 70° C., and allowed to react for 12 hrs while stirring. The reactor was cooled down to 40° C. and stirring was stopped, followed by settling for 10 min and decantation. 100 mL of toluene was injected into the reactor, followed by stirring for 10 min, settling for 10 min, and decantation. 0.34 g of the catalyst precursor D prepared in Comparative Synthesis Example 3 was mixed with 100 mL of toluene, the mixture was injected into the reactor, and allowed to react while stirring for 1.5 hrs. Then, 0.43 g of the catalyst precursor E prepared in Comparative Synthesis Example 1 was mixed with 30 mL of toluene, the mixture was added to the reactor, and allowed to react for 1.5 hrs. The reactor was cooled down to room temperature, and stirring was stopped, followed by settling for 10 min and decantation. 100 mL of hexane was injected into the reactor, the hexane slurry was transferred to a Schlenk flask, and the hexane solution was subjected to decantation. The resultant was dried at room temperature under reduced pressure for 3 hrs.

Comparative Catalyst Example 5

A supported catalyst was prepared in the same manner as in Comparative Catalyst Example 3, except that 0.50 g of the catalyst precursor structure G prepared in Comparative Synthesis Example 4 was used.

Preparation Example of Polyethylene Polymerization

Polymerization Examples 1 to 6 and Comparative Polymerization Examples 1 to 5: Preparation of Polyolefin Ethylene Polymerization 2 mL of TEAL (1 M in hexane) and 80 g of 1-hexene were injected into a 2 L autoclave reactor, to which 0.6 kg of hexane was added and then heated to 70° C. while stirring at 500 rpm. 21.1 mg to 54.0 mg of the supported catalysts (Catalyst Examples 1 to 6 and Comparative Catalyst Examples 1 to 5) were placed with hexane in vials, and 0.2 kg of hexane was further added. When the internal temperature of the reactor reached 70° C., the solution was reacted under an ethylene pressure of 30 bar for 1 hr while stirring at 500 rpm. Hydrogen was injected at a rate (0.012% to 0.002%) determined according to a flow rate of ethylene. After completion of the reaction, a resulting polymer was filtered to primarily remove hexane, and then dried in oven at 80° C. for 3 hrs.

Particularly, the ethylene polymerization was performed with addition of hydrogen. A test was performed by varying the feeding amount of hydrogen and the amount of the catalyst in consideration of the activity and molecular weight during ethylene homopolymerization, hydrogen reactivity, etc. in order to adjust target MI2 in the range of 0.1 to 1.0.

In the polymerization process, the catalytic activity and physical properties of the resulting polymers were measured by the following methods, and the results are shown in the following Table 1.

1) Catalytic Activity

The weight of the produced polymer per unit weight of the catalyst per unit time was measured to determine catalytic activity in the polymerization process using the metallocene-supported catalyst.

2) MI Measurement

MI 2.16 value of the produced polyolefin was determined in accordance with American Society for Testing Materials (ASTM) D 1238 at 190° C. under a load of 2.16 kg (unit: g/10 min).

3) BD (Bulk Density) Measurement

A weight of powder filled in a 100 mL container was determined in accordance with American Society for Testing Materials (ASTM) D 1895 B (unit: g/mL).

The reaction conditions and results of Polymerization Examples 1 to 6 and Comparative Polymerization Examples 1 to 5 are summarized in the following Table 1.

TABLE 1

|  | Catalyst (structure) | Content of catalyst (mg) | Activity (kgPE/gCat) | $H_2$ feed (mol %) | MI_2.16 (g/10 min) | BD (g/mL) |
|---|---|---|---|---|---|---|
| Polymerization Example 1 | Example 1 (A) | 21.1 | 5.5 | 0.02 | 0.72 | 0.29 |
| Polymerization Example 2 | Example 2 (B) | 49.5 | 4.3 | 0.10 | 0.12 | 0.30 |
| Polymerization Example 3 | Example 3 (C) | 29.8 | 3.6 | 0.03 | 0.48 | 0.29 |
| Polymerization Example 4 | Example 4 (A/B) | 40.0 | 4.8 | 0.07 | 0.40 | 0.30 |
| Polymerization Example 5 | Example 5 (A) | 23.9 | 4.6 | 0.02 | 0.75 | 0.29 |
| Polymerization Example 6 | Example 6 (B) | 54.0 | 3.9 | 0.10 | 0.15 | 0.30 |
| Comparative Polymerization Example 1 | Comparative Example 1 (E) | 50.1 | 3.0 | 0.10 | 0.22 | 0.28 |
| Comparative Polymerization Example 2 | Comparative Example 2 (F) | 30.2 | 2.5 | 0.03 | 0.50 | 0.27 |
| Comparative Polymerization Example 3 | Comparative Example 3 (E) | 48.8 | 3.4 | 0.10 | 0.20 | 0.27 |
| Comparative Polymerization Example 4 | Comparative Example 4 (D/E) | 43.1 | 3.8 | 0.07 | 0.53 | 0.27 |
| Comparative Polymerization Example 5 | Comparative Example 5 (G) | 37.2 | 2.0 | 0.12 | 0.30 | 0.28 |

Polymerization conditions: ethylene pressure of 30 bar, temperature of 70° C. ° reaction time of 60 min.

As shown in Table 1, the present disclosure provides an excellent effect that the polyolefin produced with high catalytic activity during olefin polymerization has high bulk density (BD). Therefore, improvement of productivity due to high bulk density may be achieved by using the metallocene-supported of the present disclosure.

When the supported catalyst having a pivalate group as a substituent according to the present invention was used as in Polymerization Example 6, catalytic activity was 3.9 kg PE/gCat and bulk density (BD) was 0.30 g/mL. In contrast, when the supported catalyst having a pentyl group as a substituent was used as in Comparative Polymerization Example 5, catalytic activity and bulk density (BD) were as remarkably low as 2.0 kgPE/gCat and 0.28 g/mL, respectively. Further, Polymerization Examples 1 and 2 showed excellent catalytic activity of 5.5 kgPE/gCat and 4.3 kgPE/gCat, and excellent bulk density (BD) of 0.29 g/mL and 0.30 g/mL, respectively. Furthermore, Polymerization Example 4 according to the present disclosure showed catalytic activity of 4.8 kgPE/gCat and bulk density (BD) of 0.30 g/mL, whereas Comparative Polymerization Example 4 showed catalytic activity of 3.8 kgPE/gCat and bulk density (BD) of 0.27 g/mL, indicating remarkable improvement in Polymerization Example 4.

Accordingly, when the metallocene-supported catalyst having the particular substituent according to the present disclosure is used, remarkably improved catalytic activity may be obtained even by using the different supporting method as in Polymerization Examples 1 and 3.

The invention claimed is:

1. A metallocene-supported catalyst comprising one or more metallocene compounds represented by the following Chemical Formula 2;
   a cocatalyst compound; and
   a support:

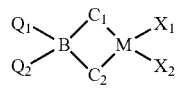

[Chemical Formula 2]

wherein, in Chemical Formula 2, M is Zr;
B is silicon;
$Q_1$ and $Q_2$ are the same as or different from each other, and are each independently a C1 to C4 alkyl group, or a C2 to C10 alkoxyalkyl group;
$X_1$ and $X_2$ are each a pivalate group; and
$C_1$ and $C_2$ are represented by the following Chemical Formula 3a:

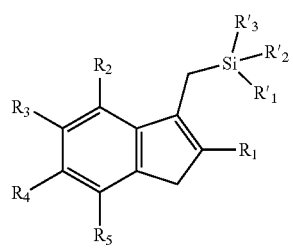

[Chemical Formula 3a]

wherein, in Chemical Formula 3a, $R_1$ to $R_5$ are the same as or different from each other, and are each independently hydrogen, or a C1 to C4 alkyl group, and $R'_1$ to $R'_3$ are the same as or different from each other, and are each independently, a C1 to C4 alkyl group,
wherein B and M of Chemical Formula 2 are bonded to the cyclopentadienyl group of the indenyl groups $C_1$ and $C_2$ of Chemical Formula 3a,
wherein the cocatalyst compound comprises one or more of compounds represented by the following Chemical Formula 4, Chemical Formula 5, or Chemical Formula 6:

[Chemical Formula 4]

wherein, in Chemical Formula 4, each $R_{23}$ is the same as or different from each other, and are each independently a halogen, a C1 to C20 hydrocarbon, or a halogen-substituted C1 to C20 hydrocarbon; and
m is an integer of 2 or more;

[Chemical Formula 5]

wherein, in Chemical Formula 5, each $R_{23}$ is the same as defined in Chemical Formula 4; and
J is aluminum or boron;

[Chemical Formula 6]

wherein, in Chemical Formula 6, E is neutral or cationic Lewis acid;
H is hydrogen atom;
Z is Group 13 element; and
each A' is the same as or different from each other, and are each independently a C6 to C20 aryl group of a C1 to C20 alkyl group, of which one or more hydrogen atoms are unsubstituted or substituted with a halogen, a C1 to C20 hydrocarbon, an alkoxy, or a phenoxy, and
wherein the support is one or more selected from the group consisting of silica, silica-alumina, and silica-magnesia.

2. The metallocene-supported catalyst of claim 1, wherein the compound represented by Chemical Formula 2 has the following structural formula:

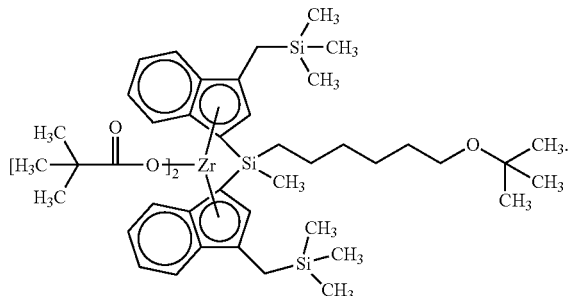

3. The metallocene-supported catalyst of claim 1, wherein a weight ratio of the total transition metals in the metallocene compound to the support is 1:10 to 1:1000.

4. The metallocene-supported catalyst of claim 1, wherein a weight ratio of the cocatalyst compound to the support is 1:1 to 1:100.

5. A method of preparing a polyolefin, which comprises polymerizing olefinic monomers in the presence of the metallocene-supported catalyst of claim 1.

6. The method of claim 5, wherein the polymerizing is performed by a solution polymerization process, a slurry process, or a gas phase process.

7. The method of claim 5, wherein the olefinic monomer comprises one or more monomers selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornane, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, and 3-chloromethylstyrene.

8. A polyolefin obtained from the method of preparing a polyolefin of claim 5.

9. The polyolefin of claim 8, wherein a weight average molecular weight is 10,000 g/mol to 1,000,000 g/mol.

* * * * *